(12) United States Patent
Salisbury

(10) Patent No.: US 6,381,326 B1
(45) Date of Patent: *Apr. 30, 2002

(54) SYSTEM FOR HANDLING LARGE BLOCKS OF SPECIAL NUMBER CALLS IN A TELECOMMUNICATIONS NETWORK

(75) Inventor: Bruce Fredrick Salisbury, Olathe, KS (US)

(73) Assignee: Sprint Communications Company L.P., Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/670,639

(22) Filed: Sep. 27, 2000

Related U.S. Application Data

(63) Continuation of application No. 08/948,438, filed on Oct. 10, 1997, now Pat. No. 6,215,866, which is a continuation of application No. 07/960,615, filed on Oct. 14, 1992, now abandoned.

(51) Int. Cl.[7] .............................. H04M 3/00; H04M 7/00
(52) U.S. Cl. .............................. 379/220.01; 379/207.14; 379/221.08; 379/221.14; 379/245; 379/289
(58) Field of Search ..................... 379/201.01, 207.14, 379/211.02, 220.01, 221.01, 221.08, 221.09, 221.14, 230, 233, 245, 289

(56) References Cited

U.S. PATENT DOCUMENTS 6,215,866 B1 * 4/2001 Salisbury ............... 379/220.01

* cited by examiner

Primary Examiner—Harry S. Hong
(74) Attorney, Agent, or Firm—Harley R. Ball; Steven J. Funk; Kevin D. Robb

(57) ABSTRACT

When telephone calls are placed by dialing a special number such as an "800" number, the dialed number is converted to a specially configured translation number that includes a destination output set of digits which are preferably the last four digits of the dialed number. This translation number is transported over the network from an originating switch to a terminating switch which then outputs the output set to the destination. Advantageously, the terminating switch also replaces the prefix portion of the translation number with an output prefix consisting of at least the NXX portion of the dialed number and outputs this prefix along with the output set to the destination for use in call tracking.

3 Claims, 1 Drawing Sheet

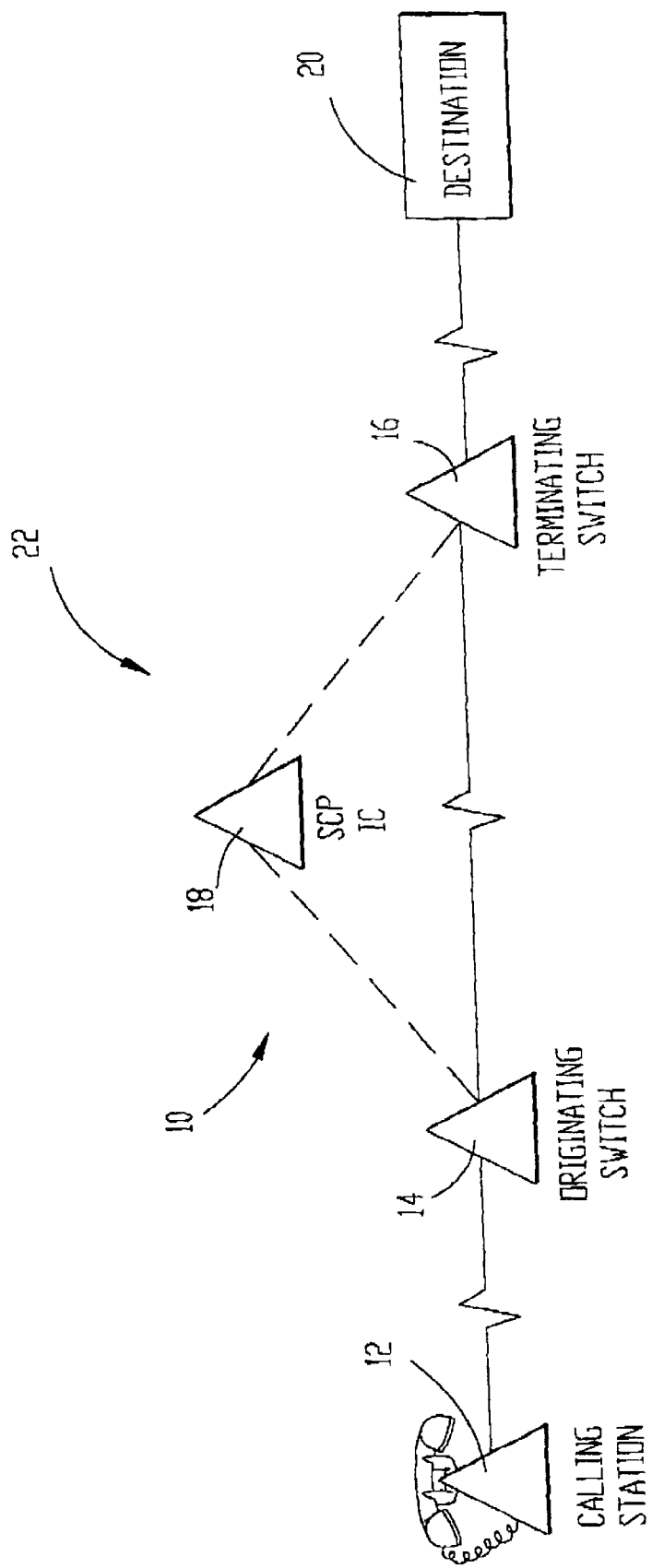

SYSTEM FOR HANDLING LARGE BLOCKS OF SPECIAL NUMBER CALLS IN A TELECOMMUNICATIONS NETWORK

RELATED APPLICATIONS

This application is a continuation of prior application Ser. No. 08/948,438, entitled "System for Handling Large Blocks of Special Number Calls in a Telecommunications Network" filed Oct. 10, 1997, which issued in U.S. Pat. No. 6,215,866, and which is a continuation of application Ser. No. 07/960,615, filed Oct. 14, 1992 now abandoned, and which are both hereby incorporated by reference into this application.

BACKGROUND OF THE INVENTION

1. Field of the Invention

The present invention relates to the field of telecommunications. More particularly, the invention is concerned with converting a special handling number into a specially configured translation number that includes a destination output set of digits which are preferably the last four digits of the dialed number. This translation number is transported over the network from an originating switch to a terminating switch which then outputs the output set contained in the translation number to the destination.

2. Description of the Prior Art

Certain telephone numbers such as "700", "800" and "900" numbers require special handling for both routing and billing. When a call is placed by dialing one of these special handling numbers, the originating switch of the telecommunications network requests a translation of the dialed number from a remote database. The database responds by providing a translation number corresponding to the dialed special number. The originating switch then uses the digits of the translation number as pointers in database tables for retrieving network routing instructions to the destination by way of a terminating switch. The translation number is also transported to the terminating switch.

When the terminating switch receives the translation number, it also uses this number to retrieve data from a set of databases that include instructions concerning special features requested by the customer. These include, for example, instructions concerning Dialed Number Identification Service (DNIS) whereby the customer specifies which digits should be outpulsed to the customer destination for identifying the dialed number. This is particularly useful when the customer has multiple 800 numbers terminating at the same destination. Some customers of 800 services are known as "resellers" who subscribe to large blocks of 800 numbers (sometimes as many as 10,000 wherein the reseller subscribes to an entire exchange represented by single NXX prefix) terminating at just one or a relatively few destinations and then resell the associated 800 services to individual customers. The reseller may have its own tandem switch at the destination to act as a gateway into a limited network of reseller.

As those skilled in the art will appreciate, the terminating switch must store in memory the required data for providing DNIS and other features for each 800 number terminating at that switch. When large blocks of 800 numbers terminate at a given switch, the normally available memory capacity of the switch can be exceeded. When this occurs, additional capacity must be added, which is expensive and can be disruptive to network operations.

SUMMARY OF THE INVENTION

The present invention solves the prior problems discussed above and provides a distinct advance in the state of the art. More particularly, the call handling system hereof substantially reduces the amount of memory required to handle large blocks of special calls terminating at a given destination.

In the preferred embodiment of the present invention, a translation number corresponding to special handling number is configured to include at least a portion of the output set of digits to be outpulsed to the destination from the terminating switch. The translation number is also configured and used for routing the call over the network from an originating switch to a terminating switch. In operation, the translation number is transported to the terminating switch which outpulses the output set contained in the translation number to the destination thereby eliminating the need for the terminating switch to store this output set in memory.

In preferred forms, all of the special numbers of a specified block of numbers are configured to include the same NXX prefix and the same NPA prefix. The terminating switch stores one or both of these prefixes in memory and then retrieves and adds this prefix information to the output set of digits in order to deliver a seven or ten digit number to the destination that matches the corresponding portion of the dialed number. In this way, only one prefix or prefix set need be stored in the memory of the terminating switch.

BRIEF DESCRIPTION OF THE DRAWINGS

The single drawing FIGURE is a schematic representation of a telecommunications network in which the present invention is implemented.

DETAILED DESCRIPTION OF THE PREFERRED EMBODIMENT

The drawing figure illustrates telecommunications network 10 including calling station 12, originating switch 14, terminating switch 16, signal control point (SCP) 18 and destination 20. As represented, switches 14, 16 and SCP 18 make up interexchange carrier (IC) 22.

Switches 14, 16 are preferably Northern Telecom DMS-250 switches and communicate with SCP 18 using signaling system seven (SS7). Each switch 14, 16 stores data in memory in the form of data tables. In the preferred brand of switch, these tables include control tables, digilator tables, route reference tables, and listab tables.

In the prior art, when a call is placed from calling station 12 by dialing a special handling number such as (800)729-5451 requiring the services of an interexchange carrier, the local exchange carrier delivers the call to originating switch 14 along with various data including the dialed special number. Switch 14 recognizes the special nature of the dialed number and transmits a translation request over SS7 to SCP 18 which responds with a seven digit translation number accompanied by a three digit Serving Translating Scheme (STS) value.

Switch 14 then uses the STS value as a pointer in the control table which, in response, provides a pointer to a set of seven digilators and another pointer to a route reference table. The seven digits of the translation number are then used in the seven digilators to provide an output specifying a particular entry in the selected route reference table. The output from the reference table designates a particular listab data set that contains various data including routing instructions for routing the call to destination 20 by way of terminating switch 16.

When the call is routed to terminating switch 16, the translation number is also transported to the switch. Terminating switch 16 goes through the same table process using the translation number in order to access and retrieve data from a set of listabs. These listabs contain information concerning the special features requested by the customer. Typically, a customer subscribing to large blocks of 800 numbers, for example, requests dialed number identification service (DNIS) which requires outpulsing a set of digits identifying the calling number to the destination. This set of digits can be any set of numbers specified by the customer but usually consists of last four digits, the last seven digits, or all ten digits of the special dialed number. The requested set of numbers to be outpulsed are stored in the listabs. The DNIS feature requires two listabs to store enough data for each dialed number terminating at switch 16 for a given customer.

As those skilled in the art appreciate, the listab memory capacity of the switch can be depleted rapidly if a customer has large quantities of special dialing numbers terminating at switch 16. For a reseller with the capability of terminating 10,000 different handling numbers at the same switch, at least 20,000 listabs are required. Additionally, 10,000 sets of seven digilators each are required for this block of special numbers at all of the network switches capable of originating a call placed to one of the special numbers.

In the present invention, the translation numbers corresponding to a block of special handling numbers associated with a given customer are configured so that a subset of the digits of each translation number includes at least a portion of the output set of digits to be outpulsed to the customer's destination from the terminating switch. More particularly, this subset is the last four digits of the translation number and consists of the last four digits of the customer requested DNIS. With this configuration, terminating switch 16 need not store particular DNIS data in listab memory because the information identifying the dialed number is contained in the translation number as the last four digits thereof delivered to the switch.

Furthermore, the respective translation numbers corresponding to the block of special numbers preferably are configured so that the translation prefix of each represents the destination. With this provision, an originating switch can determine the routing of a special handling call by using the three digit translation prefix plus the STS value. In this way, each switch in the network need only store a set of three digilators for each translation number instead of the seven digilators required in the prior art.

Additionally, the block of special handling numbers associated with a given customer are configured to include the same NPA prefix (e.g., 800) and the same NXX prefix (e.g., 729). In other words, all the calls placed by dialing one of these special numbers and terminating at switch 16 have the same NPA and NXX prefix. If the customer specifies DNIS outpulsing of either or both of these prefixes along with the last four digits of the dialed number, the desired prefixes can be stored in a single set of listabs and retrieved for all of the special calls terminating to the customer at destination 20.

As an example of the operation of the present invention, when a call is placed from station 12 by the dialing of (800) 729-5451 (one of a large block of 800 numbers of the same customer with all having 800 as the NPA and 729 as NXX prefix), the local exchange carrier routes the call along with this dialed number to originating switch 14. Switch 14 then transmits the dialed number and a translation request to SCP 18 which responds by delivering a seven-digit translation number such as 2205451 along with an STS value such as 123 to switch 14. In this translation number, the digits "220"

are the translation prefix and represent destination 20, and the digits "5451" are the same as the last four digits of dialed number and make up the translation subset to be outplused to destination 20.

Upon receipt of the translation number and STS value, switch 14 uses the STS value 123 in the control table as a pointer to select a route reference table and a set of three digilators. The translation prefix 220 is then used with the digilators to determine the pointer for the corresponding entry in the selected route reference table. This route reference entry designates the listab containing the routing instructions for routing the call from switch 14 to destination 20 by way of terminating switch 16. The call is then routed over IC 22 and the translation number transported to switch 16. With this mode of operation of the present operation, only three digilators are needed in correspondence with the translation number in order to retrieve the routing instructions for the call. This is in contrast to the prior art which requires seven digilators for each translation numbers at each switch that may originate a call placed to the corresponding 800 number.

When termination switch 16 receives the translation number and STS value, switch 16 performs the table processing operation described above in connection with switch 14 in order to retrieve the particular listabs containing the customer feature instructions for the dialed number. In the present example, these instructions indicate DNIS. In response, terminating switch 16 deletes the translation prefix 220 and outpulses the remaining digit subset 5451 to destination 20. The digits 5451 completely identify the called number because the NPA and NXX prefixes are the same for all calls routed to the block customer at destination 20. As will be appreciated, these steps eliminate the need for switch 16 to store DNIS data in listabs for each 800 number.

For additional tracking or accounting purposes, the customer may specify that the outpulsed number include the NXX prefix, or include both the NXX and NPA prefixes. If such is the case, the selected listabs contain the specified prefix or prefixes. Switch 16 then adds the appropriate prefix digits to the digit subset 5451 in order to form a complete ten digit outpulsed number such as 8007295451, which is the same as the dialed number.

With the above description in mind, it will be appreciated that the present invention only requires data storage in a total of two listabs at terminating switch 16 in order to provide the customer specified DNIS output digits including the specified prefixes for all of the special numbers of the customer terminating at destination 20. This compares to the requirement in the prior art of two listabs for each of the 10,000 special numbers for a total of 20,000 listabs.

As those skilled in the art will appreciate, the present invention encompasses many variations in the preferred embodiment described herein. For example, the invention can be used in networks using switching equipment, signaling systems, and data storage formats other than those described. In addition, the invention finds utility for any type of dialed number requiring translation, conversion or modification which might include so called "900" and "700" numbers, for example.

As a final example, the present invention can also be used in the situation where the customer has multiple terminating destinations and where the destinations of selected calls are changed from time to time. In order to change the destination of a special call to a different destination to the same customer, the SCP translation data is changed to reflect a new destination. In the present invention, only changes in a translation number prefix and STS are required to specify the new customer destination.

Having thus described the preferred embodiment of present invention, the following is claimed as new and desired to be secured by Letters Patent:

1. A method for operating a communication network and, the method comprising:

configuring the communication network with a translation number for a dialed number wherein the dialed number comprises NPA-NXX-XXXX and the translation number comprises a destination code and the XXXX from the dialed number;

receiving a call to the dialed number and translating the dialed number into the translation number;

using the translation number to route the call and the translation number over the communication network; and outputting the XXXX from the translation number to a destination without outputting the NPA, without outputting the NXX, and without accessing a Dialed Number Identification Service database.

2. The method as set forth in claim 1 wherein the dialed number is an 800 number.

3. The method as set forth in claim 1 wherein the dialed number is a 900 number.

* * * * *